DIGITAL PHASE LOCK LOOP FOR BIT TIMING RECOVERY

Filed Nov. 16, 1966 3 Sheets-Sheet 1

INVENTOR
JOHN G. PUENTE

BY Sughrue, Rothwell, Mion, Zinn & Macpeak
ATTORNEYS

April 28, 1970 J. G. PUENTE 3,509,471

DIGITAL PHASE LOCK LOOP FOR BIT TIMING RECOVERY

Filed Nov. 16, 1966 3 Sheets-Sheet 2

United States Patent Office 3,509,471
Patented Apr. 28, 1970

3,509,471

DIGITAL PHASE LOCK LOOP FOR BIT TIMING RECOVERY

John G. Puente, Rockville, Md., assignor to Communications Satellite Corporation, a corporation of the District of Columbia Filed Nov. 16, 1966, Ser. No. 594,829
Int. Cl. H03k *5/159, 17/26*
U.S. Cl. 328—55 10 Claims

ABSTRACT OF THE DISCLOSURE

A digital phase locking circuit for recovering the timing of bits received in bursts from a communication channel. Clock pulses from a local clock generator are applied to a tapped delay line each of whose outputs is connected to one gate in a gate network. A clock pulse passes through only the gate which is enabled by the count in a reversible counter. A digital phase comparing circuit compares the phase of the clock pulses from the gate network with the phase of the transitions of the bits from the channel. The reversible counter is incrementally stepped to open the appropriate adjacent gate which will produce a gate signal delayed or advanced by one time increment to reduce the phase difference between the clock and bit pulses. An ambiguity signal is produced when a bit transition occurs within a region approximately 180° out of phase with a clock pulse. When a predetermined number of consecutive ambiguity signals is produced, an ambiguity circuit automatically shifts the counter to a count corresponding to one-half a clock period, thereby placing the clock and bit pulse trains in synchronism in one step. Another circuit may be included to permit the phase correction to be made only on alternate clock pulses.

This invention relates generally to an improved bit timing recovery circuit and more particularly to a digital phase locking circuit for rapidly locking the phase of a local clock to a stream of bit signals.

The invention may be briefly and broadly summarized as a novel digital phase locking circuit for recovering the bit timing from a burst of bits transmitted through a communication channel. Local clock pulses are applied to a delay line having plural taps which are connected through a gating network to an output line. A comparison circuit compares the phases of the clock and bit pulses. If a phase difference exists, a control means operates the gating network so that that the next clock pulse passed to the output line is incrementally changed in phase to reduce the phase difference. An ambiguity circuit functions to eliminate hunting which may occur when successive bit pulses are approximately 180° out of phase with the clock pulses.

This invention is particularly useful in rapidly recovering bit timing and TDM bursts received from an orbital satellite relay station in a time division multiple access satellite communication system.

The foreging and other objects, features and advantages of the invention will be apparent from the following more particular description of a preferred embodiment of the invention, as illustrated in the accompanying drawings, in which.

In the transmission of information in discrete form, i.e. binary, ternary, etc., it is often necessary to recover bit timing either to regenerate the discrete information or decode the information optimally. Some means of bit timing recovery must be provided in order to accomplish this result, and often the recovery of bit timing is the most difficult operation in the reception of discrete information modulated in almost any form such as phase shift keying (PSK), frequency shift keying (FSK), amplitude modulation (AM), etc.

The problem of bit timing recovery is particularly acute in a new time division multiple access satellite communication system in which bit rates in the six to fifty megabit-per-second range are used.

The function of a bit timing recovery (BTR) unit is to recover bit timing quickly, accurately, and with high stability for each station's signal burst in the TDM time frame in the satellite. If it were possible to place each burst in a time slot to within fractional bit accuracy and if Doppler were negligible in a frame-to-frame time period, and if all clocks in the system were of high stability and accuracy, bit timing could be accomplished on a per frame basis and used for all bursts within a frame.

Unfortunately at high bit rates, e.g., 50 megabits per second, the bursts would have to be positioned in the satellite with a one or two nanosecond accuracy which is an impractical solution. The digital phase locking circuit of this invention recovers bit timing for each burst in the frame, thereby relaxing the constraints on burst position accuracy and clock stability.

The broad object of this invention is to provide a bit timing recovery unit which produces a local pulse stream which is synchronized to the transitions of the received data.

One known prior art bit timing recovery unit contains an analog phase lock loop for recovering bit timing in a continuous stream of data from a single source. The time required to synchronize to the incoming data stream is 1000 microseconds which may be a reasonable time in continuous mode operation but is impractical when information is coming from different sources in bursts of 40 microseconds or less. Thus it was necessary to develop the digital phase locking circuit of this invention to recover bit timing in the bursts used in a time division multiple access satellite communication system.

Figure 1:
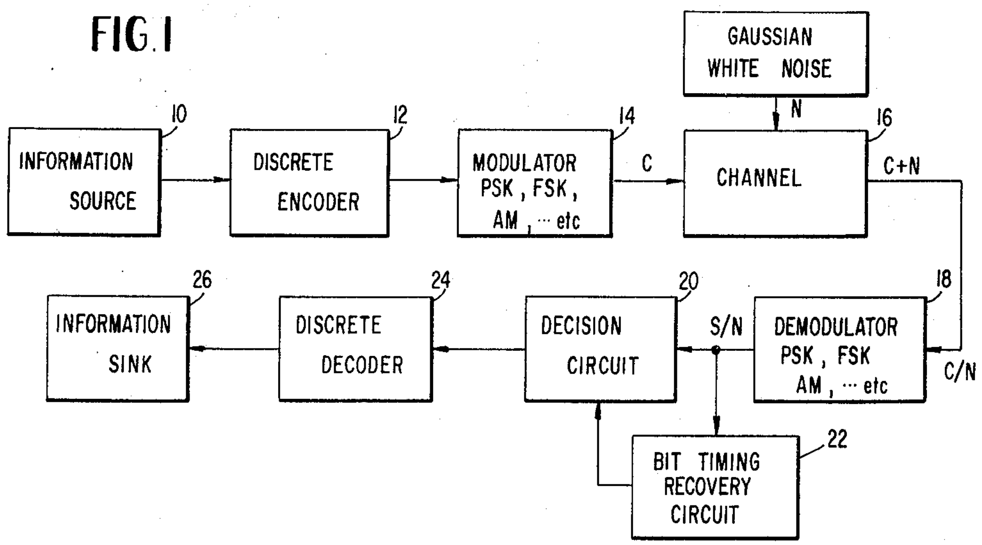
FIGURE 1 is a generalized block diagram of a digital communication system in which the improved bit timing recovery circuit may be advantageously used.

A simplified block diagram of a discrete transmission system is shown in FIGURE 1. The information source 10 can be either analog or digital. The information is encoded into discrete form by an encoder 12. Dependent on the channel characteristics of the communication system, the discrete information is modulated in a modulator 14 in either PSK, FSK, AM, etc. The modulated encoded information C is passed through a communication channel 16 where white Gaussian noise N is added. We will assume that the channel bandwidth is sufficient to transmit the signal without intersymbol distortion. The input to the demodulator 18 is the sum of the modulated carrier C plus noise N. The signal-to-noise $S/N$ ratio of the output of demodulator 18 is dependent on the type of modulation being considered. For the purposes of this discussion, we will consider only two phase coherent PSK modulation. In this case, when the $C/N$ ratio is measured in a bandwidth equal to the transmitted bit rate, the $S/N$ ratio is equal to $$S/N=C/N+3 \text{ db} \quad (1)$$

Conventional PSK modulator-demodulators operate at a minimum $C/N$ of 10 db, thus the $S/N$ output is normally 13 db or greater. Other types of modulation may require higher $S/N$, but the fundamental principle is the same. This is, information is being received with noise which causes the decision circuit 20 to make incorrect decisions. The probability of error as a function of $C/N$ or $S/N$ has been investigated by many authors. In their analyses the assumption is generally made that bit timing is available to the decision circuit without noise and coherent with the incoming information. This assumption is valid only if there is allowed a sufficient time for a local bit timing recovery circuit 22 to lock on the received information, so that properly time information pulses are fed to a decoder 24 and then to an information sink 26.

Figure 2:
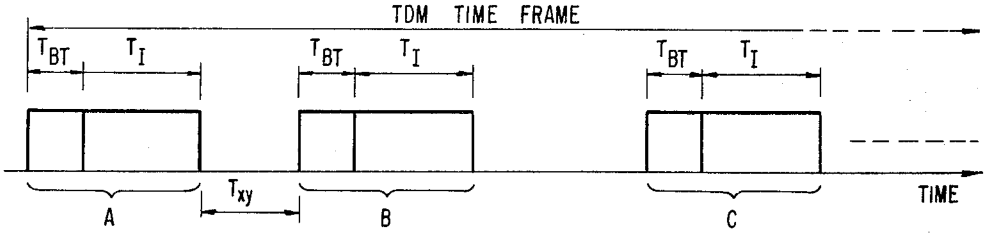
FIGURE 2 is a schematic diagram of a portion of a TDM time frame.

However, when the information is received in bursts, and the bursts are relatively short and incoherent with each other, the local clock must recover bit timing as rapidly as possible in order to maintain a high communication efficiency. FIGURE 2 is a block diagram of a portion of the time frame in a time division multiple access satellite communication system. Three bursts A, B and C are shown. $T_{BT}$ represents the preamble word preceding the information burst time $T_I$ and represents the time at which bit timing recovery must be accomplished. $T_{x,y}$ is the time between contiguous TDM bursts. Let us assume that the time $T_{x,y}$ between adjacent bursts is constant and negligible in length and the information bursts $T_I$ are equal in length, then the communication efficiency $e$, defined as the percent of the total time over which information is being received, may be expressed as follows:

$$e=\frac{T_I}{T_I+T_{BT}\times 100} \qquad (2)$$

Thus, as $T_{BT}$ approaches zero, the communication efficiency approaches 100%. Equation 2 demonstrates that $T_{BT}$ should be as small as possible especially as $T_I$ or the information burst length becomes smaller and smaller.

Figure 3:
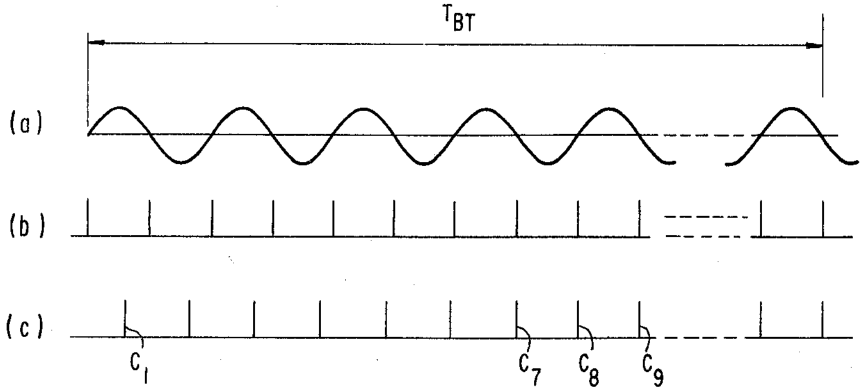
FIGURE 3 is a timing diagram showing the relationship between local clock pulses and signals received from a communication channel.

The improved bit timing recovery circuit of this invention provides fast and stable timing recovery as described in more detail below. It may also be described as a digital phase lock loop as compared to the more conventional analog phase lock loop. The circuit functions to shift in time the clock pulses generated by a local highly stable clock generator so that the clock pulses coincide with the transition points of the incoming information. This relationship is illustrated in the timing diagram of FIGURE 3 where line *a* is the demodulated information from the output of demodulator 18, line *b* is a train of pulses corresponding to the transitions or points of change of slope in line *a*, and line *c* is the train of local clock pulses. The diagram shows the clock pulses C1–C6 are out of phase with the transition pulses in line *b*. However, due to the operation of the improved digital phase lock loop of this invention, the local clock pulses are incrementally shifted until clock pulse C7 coincides with a transition pulse on line *b*, so that the following clock pulses C8, C9 . . . are locked in phase with the transition pulses. Therefore bit timing has been recovered, and the adjusted clock pulses are used to control the timing of the station decoder to insure that all the information in line *a* is recovered.

Figure 4:
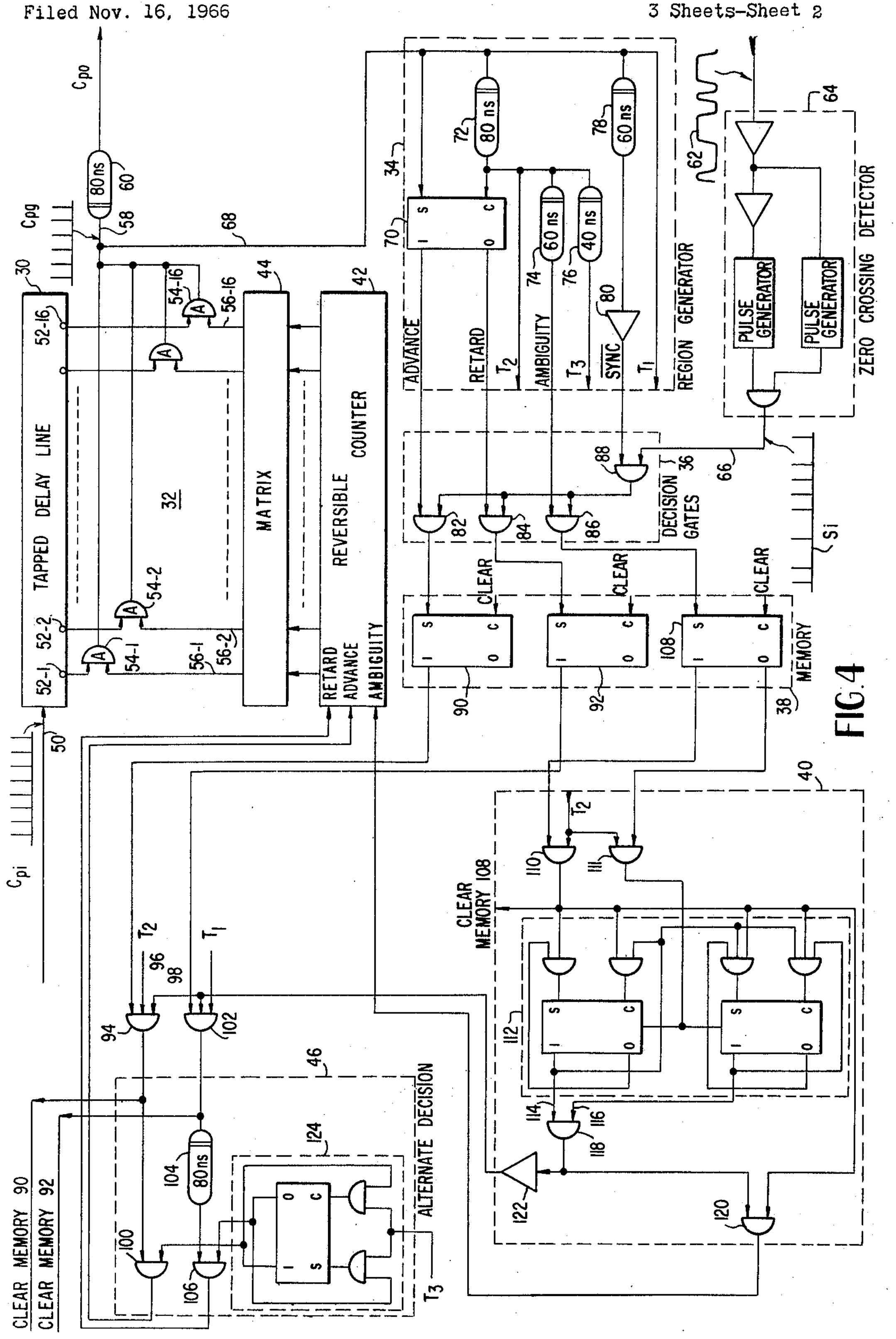
FIGURE 4 is a clock diagram of the components and logic circuits used in a preferred embodiment of the invention.

FIGURE 4 is a logical block diagram of a preferred embodiment of the improved digital bit timing recovery circuit of this invention.

Figure 5:
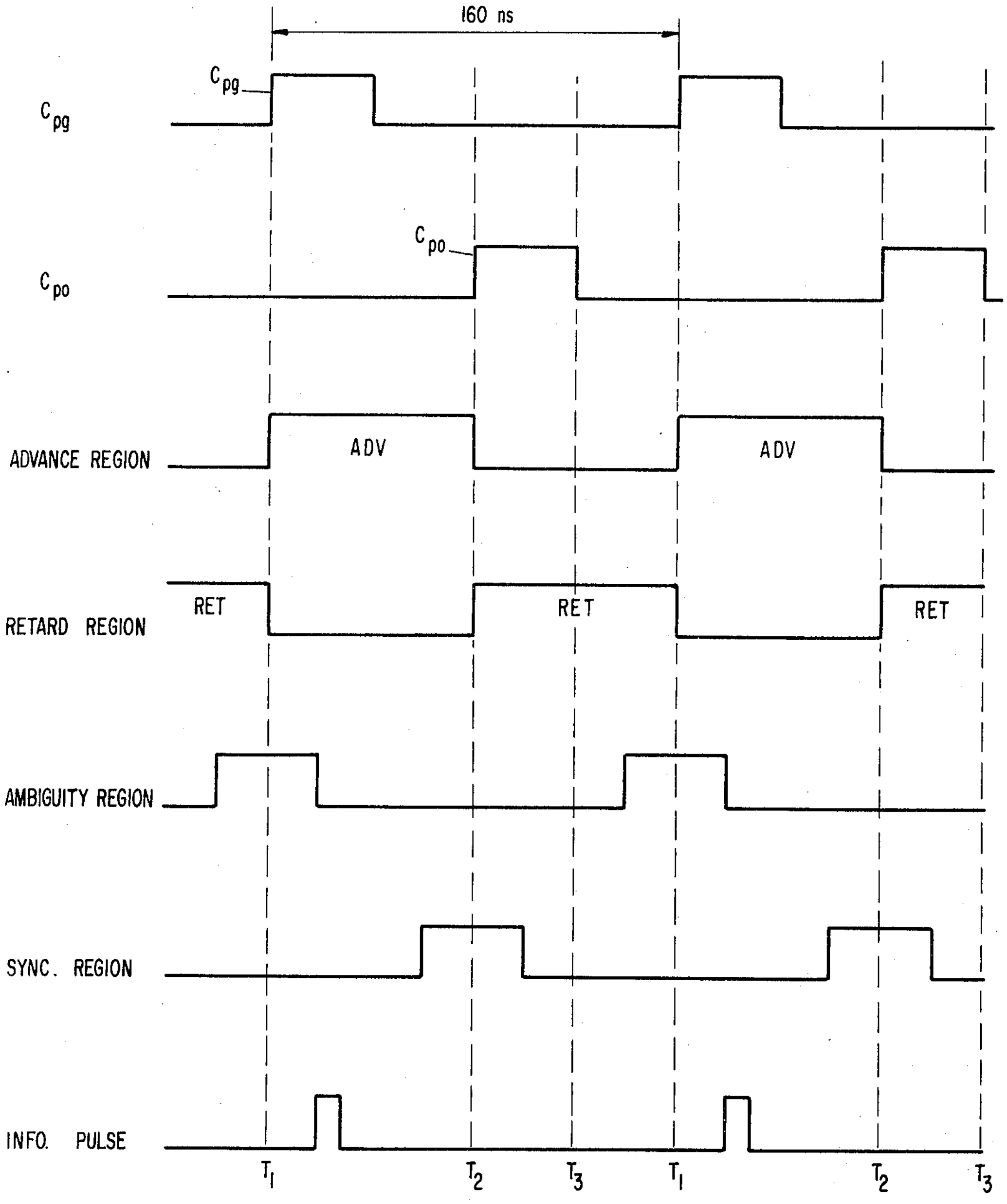
FIGURE 5 is a pulse timing diagram useful in understanding the operation of FIGURE 4.

FIGURE 5 is a timing diagram useful in the understanding of the operation of the circuit of FIGURE 4.

The main components of the improved circuit of FIGURE 4 are a tapped delay line 30, a gate network 32, a REGION signal generator 34, decision gates 36, a memory 38, an ambiguity circuit 40, a reversible counter 42, and a decoder matrix 44. An alternate decision circuit 46 is also included but is optional.

Clock pulses $C_{pi}$ are applied to the input 50 of tapped delay line 30. Let us assume that the bit repetition rate of the satellite communication system is 6.176 megabits per second; therefore, the local clock rate is also 6.176 megabits per second. The bit period would then be 162 nanoseconds, but we will round this off to 160 nanoseconds for the purposes of the description. The clock pulses are 40 nanoseconds long. We will assume that delay line 30 has 16 taps 52–1, 52–2 . . . 52–16, even though this figure is variable depending upon the fineness of resolution desired. The tapes 52 are connected to corresponding AND gates 54–1, 54–2 . . . 54–16 in gate network 32. The AND gates 54 are enabled when corresponding outputs 56–1, 56–2 . . . 56–16 of decoder matrix 44 are energized. Only one AND gate 54 is enable at any one time. Matrix 44 is controlled by the output of the conventional reversible counter 42, so that only one of the outputs 56 is energized for a given count or state of counter 42.

Taps 52 are preferably spaced equally so that the time delay between taps is equal. Consequently, for every input clock pulse $C_{pi}$, 16 pulses are available on the delay line taps 52. However, only one of the taps is connected to an enabled gate 54, and the corresponding delayed clock pulse passes through the gate network and emerges on the network output line 58 as a clock pulse $C_{pg}$. This pulse passes through a delay line 60 which provides a delay of 80 nanoseconds. The adjusted output clock pulses $C_{po}$ appear on the output of the delay line 60. The incoming signal train 62 from the demodulator 18 is applied to a zero crossing detector 64 which provides on its output 66 a train of bits corresponding to the zero crossing or transitions of the signal train 62. These transitional information pulse bits are 10 nanoseconds long and are shown in line 7 of the timing chart of FIGURE 5 and are labelled $S_i$. Each clock pulse $C_{pg}$ from the gate network 32 is fed via conductor 58 and a conductor 68 to the input of REGION signal generator 34 which consists of a flip-flop 70, an 80 nanosecond (ns.) delay line 72, a 60 ns. delay line 74, a 40 ns. delay line 76, another 60 ns. delay line 78 and an inverter 80. A clock pulse $C_{pg}$ applied to the input of REGION generator 34 sets flip-flop 70 to the "1" state and enables decision gate 82. Eighty nanoseconds later, the output of delay line 72 sets flip-flop 70 to its "0" state, thereby disabling AND gate 82 and enabling AND gate 84. 140 nanoseconds after the occurrence of clock pulses $C_{pg}$, the output of delay line 74 enables the AND gate 86.

Furthermore, 60 nanoseconds after the pulse $C_{pg}$ is applied to the input of REGION generator 34, a pulse occurs on the output of delay line 78 and is applied through inverter 80 to one of the inputs of an AND gate 88, thereby disabling AND gate 88 for 40 nanoseconds. AND gate 88 is normally enabled by the $\overline{\text{SYNC}}$ output of inverter 80 during the remainder of a clock period. Consequently, when a pulse $S_i$ appears on conductor 66 in less than 60 nanoseconds after the occurrence of clock pulse $C_{pg}$, a pulse output appears on the output of advance decision gate 82 to set flip-flop 90 in memory 38. The SYNC region is defined as a 40 nanoseconds region centered on each output clock pulse $C_{po}$. The circuit of this invention functions to shift the $C_{po}$ pulses until they coincide with the information pulses $S_i$. The $C_{po}$ and $S_i$ pulses are considered to be in synchronism when they both fall within the 40 nanoseconds SYNC region illustrated on line 6 of the timing chart of FIGURE 5. Consequently, if information pulse $S_i$ occurs between 60 and 100 ns. after the occurrence of the pulse $C_{pg}$, the $\overline{\text{SYNC}}$ signal drops to disable gate 88 and consequently disable all the gates 82, 84, 86 so that no clock correction takes place. However, after the 40 ns. SYNC period passes, i.e. between 120 and 180 nanoseconds after the occurrence of $C_{pg}$, the $\overline{\text{SYNC}}$ output of inverter 80 is once again up and enables gate 88. Consequently, if an information bit pulse should occur in this latter period, the output from retard AND gate 84 would set the flip-flop 92.

In FIGURE 5, the information pulses $S_i$ are shown as falling within the ADVANCE REGION. In this case, the "I" output of flip-flop 90 is applied to one of the inputs of an AND gate 94. The middle input 96 is enabled at time $T_2$ by the output of delay line 72 eighty nanoseconds after the occurrence of the clock pulse $C_{pg}$. The lower input 98 is also normally enabled as will be described later. The output of gate 94 passes through an open gate 100 to the ADVANCE input of counter 42, thereby advancing the state of the counter by one increment or step. The state of the counter is then decoded by matrix 44 to open another gate in network 32. Since, for the example chosen, the output clock $C_{po}$ must be advanced to bring it into closer time coincidence with the information pulse $S_i$, the gate opened by the output of matrix 44 will be the gate adjacent the previously open gate in the direction toward the input of the delay line 30. Consequently, the local output clock pulse train $C_{po}$ will be advanced in phase or time by one increment, which in the example chosen, is 10 ns. Flip-flop 90 is cleared by the output from gate 94.

In a similar manner, if an information pulse $S_i$ occurs in the interval 120 to 180 ns. after the occurrence of a pulse $C_{pg}$, the "1" output of flip-flop 92 enables the upper input of another gate 102 whose lower input is enabled by the following $C_{pg}$ pulse. The middle input of AND gate 102 is normally enabled as will be described later. The output of AND gate 102 is fed through an 80 ns. delay line 104 and through an AND gate 106 to the retard input of reversible counter 42. In this case, since the clock pulse is leading the information pulse, the matrix will select a gate connected to a delay line tap adjacent the preceding tap in the direction towards the end of the delay line. The output pulse train $C_{po}$ will then be retarded one increment of 10 ns. The output from gate 162 clears flip-flop 192.

If an information pulse $S_i$ occurs approximately 180° out of phase with an output clock pulse $C_{po}$, oscillation may occur since there may be a succession of alternate advance and retard corrections. We therefore define an ambiguity region as a 40 nanosecond interval in the middle of the period of the output clock pulses $C_{po}$. If an information pulse $S_i$ should occur during this ambiguity region, it is desirable to immediately shift the clock pulse train $C_{po}$ by 180° or 80 ns. However, since a noise pulse can often be detected as an information pulse, it is desirable to require a predetermined number of consecutive information pulses to fall in the ambiguity region before the 80 ns. correction is made. Ambiguity circuit 40 functions to provide this result.

140 microseconds after the occurrence of a clock pulse $C_{pg}$, the output from delay line 74 enables AND gate 86. If an information pulse $S_i$ appears in the following 40 ns. interval, it passes through AND gate 88 and AND gate 86 to set a flip-flop 108 in its "1" condition. The output of flip-flop 108 enables an AND gate 110 which passes a pulse from the output delay line 76 at $T_2$ 120 ns. after the next pulse $C_{pg}$ to apply an input to a two stage binary counter 112. The output of AND gate 110 is also fed back to clear flip-flop 108. Output lines 114 and 116 of counter 112 are energized after three consecutive input from AND gate 110. This provides an output from AND gate 118, which enables another AND gate 120, but disables AND gates 94 and 102 through the action of an inverter 122. Consequently, when a fourth consecutive output occurs on the output of AND gate 110, it passes through AND gate 120 to the ambiguity input of reversible counter 42. The counter is shifted in state through a period or count corresponding to one-half of the clock pulse period or 80 ns. The matrix then selects a gate connected to a tap eight taps away from the tap which passed the immediately preceding input clock pulse. Consequently, bit timing is recovered in one step rather than eight increments. We count four consecutive ambiguity signals before making the 180° phase correction to eliminate the possibility that three or fewer ambiguity signals were generated by noise and therefore did not represent a true 180° phase difference between an output clock pulse $C_{po}$ and an information bit pulse $S_i$. The "0" or clear output of flip-flop 108 is connected to one input of an AND gate 111 whose output resets counter 112. If flip-flop 108 has not been set by time $T_2$, then counter 112 is reset.

A single stage binary counter 124 is included in the alternate decision circuit 46. The output of delay line 76 changes the state of counter 124 one hundred twenty nanoseconds after each clock pulse $C_{pg}$ The "1" output of the counter is connected to the lower input of gate 100 so that gate 100 is effectively open during alternate clock periods. The lower input of AND gate 106 is connected to the "0" output of counter 124, but the retard pulse applied to the other input of AND gate 106 is delayed 80 ns. by delay line 104, and consequently gate 106 is enabled during the same alternate clock periods as gate 100.

The alternate decision circuit is an optional feature and functions to slow down the inputs to counter 42. Some counters may not be fast enough to respond to an advance, retard or ambiguity command pulse, which follows the preceding command pulse by 100 ns., for example. Circuit 46 permits a clock phase correction to be made on only every other clock pulse. However, if a sufficiently high speed counter 42 is used, the alternate decision circuit 46 is not required.

While the invention has been particularly shown and described with reference to preferred embodiments thereof, it will be understood by those skilled in the art that various changes in form and details may be made therein without departing from the spirit and scope of the invention.

What is claimed is:

1. A bit timing recovery circuit for digitally locking a train of clock pulses into synchronism with a train of information pulses having substantially the same period as the clock pulses, said circuit comprising:

(a) pulse delay means having an input and a plurality of outputs, said pulse delay means having a total delay time substantially equal to said period, and each of said outputs providing a delay equal to a different portion of said total delay time, (b) means for applying a clock pulse to the input of said delay means, (c) gate means connected to each of said outputs and operative to pass said clock pulse from only a selected one of said outputs, (d) digital control means responsive to the difference in phase between each passed clock pulse and a corresponding information pulse to provide a control signal indicative of the sign of said difference in phase, and (e) means for applying said control signal to said gate means to pass a subsequent clock pulse from only a selected one of said outputs to advance or retard said subsequent clock pulse so that the difference in phase between said subsequent clock pulse and a corresponding subsequent information pulse is reduced, whereby the phase of said clock pulses is incrementally shifted until the clock pulses are synchronized with said information pulses, at which time the clock pulses pass through only one of said outputs to said gate means.

2. A bit timing recovery circuit as defined in claim 1 further comprising means to inhibit said digital control means when said clock and information pulses are in synchronism.

3. A bit timing recovery circuit as defined in claim 1 wherein said delay means is a delay line and said outputs are spaced taps on said delay line.

4. A bit timing recovery circuit as defined in claim 1 wherein said digital control means comprises:

(a) a phase comparison means for generating an advance control signal when a clock pulse lags a corresponding information pulse and a retard control signal when a clock pulse leads a corresponding information pulse, (b) a reversible counter coupled between said phase comparison means and said gate means for operating said gate means, each state of said counter corresponding to a different one of said outputs of said delay means, and (c) means for driving said counter to change its state in response to said advance and retard control signals.

5. A bit timing recovery circuit for digitally locking a train of clock pulses into synchronism with a train of information pulses comprising:

(a) pulse delay means having an input and a plurality of outputs, (b) means for applying a clock pulse to the input of said delay means, (c) gate means connected to each of said outputs and operative to pass said clock pulse from only a selected one of said outputs, (d) digital control means responsive to the difference in phase between a passed clock pulse and an information pulse for operating said gate means to pass a subsequent clock pulse from only a selected one of said outputs whereby the phase of said clock pulses is incrementally shifted until the clock pulses are synchronized with said information pulses, said digital control means further comprising means for generating an advance control signal when a passed clock pulse lags a corresponding information pulse and for generating a retard control signal when a passed clock pulse leads a corresponding information pulse, and (e) means for applying the generated control signal to said gate means to pass a subsequent clock pulse from only a selected one of said outputs respectively to advance or retard the subsequent clock pulse and thereby reduce the difference in phase between the subsequent clock pulse and a corresponding subsequent information pulse.

6. A bit timing recovery circuit for digitally locking a train of clock pulses into synchronism with a train of information pulses comprising:

(a) a delay line having an input and a plurality of spaced output taps, (b) means for applying a clock pulse to the input of said delay line, (c) gate means connected to each of said output taps and operative to pass said clock pulse from only a selected one of said output taps, (d) digital control means responsive to the difference in phase between a passed clock pulse and an information pulse for operating said gate means to pass a subsequent clock pulse from only a selected one of said output taps whereby the phase of said clock pulses is incrementally shifted until the clock pulses are synchronized with said information pulses, said digital control means further comprising:

(1) a phase comparison means for generating an advance signal when a clock pulse lags a corresponding information pulse and a retard signal when a clock pulse leads a corresponding information pulse, (2) a reversible counter coupled between said phase comparison means and said gate means for operating said gate means, each state of said counter corresponding to a different one of said delay line taps, and (3) means for driving said counter to change its state in response to said advance and retard signals, and (e) means to inhibit said digital control means when said clock and information pulses are in synchronism.

7. A bit timing recovery circuit as defined in claim 6 further comprising means for inhibiting said driving means on alternate clock pulses.

8. A bit timing recovery circuit as defined in claim 7 wherein said delay line taps are equally spaced and said gating means is operative to select successive taps in either direction in response to changes in the state of said counter.

9. A bit timing recovery circuit as defined in claim 8 further comprising an ambiguity circuit for producing an ambiguity signal when a clock pulse and an information pulse are approximately 180° out of synchronism.

10. A bit timing recovery circuit as defined in claim 9 further comprising means for storing a predetermined number of consecutive ambiguity signals, and means responsive to said predetermined number to change the state of said counter so that said gate means is operated to select a tap which passes subsequent clock pulses shifted in phase by 180°.

References Cited

UNITED STATES PATENTS

| | | | |
|---|---|---|---|
| 3,024,417 | 3/1962 | Secretan | 328—110 XR |
| 3,185,963 | 5/1965 | Peterson et al. | 307—269 XR |
| 3,209,265 | 9/1965 | Baker et al. | 328—63 |
| 3,238,462 | 3/1966 | Ballard et al. | 328—63 |
| 3,363,183 | 1/1968 | Bowling et al. | 328—63 |
| 3,388,216 | 6/1968 | Brooke et al. | 178—69.5 XR |
| 3,394,355 | 7/1968 | Sliwkowski | 340—172.5 |

JOHN S. HEYMAN, Primary Examiner

S. D. MILLER, Assistant Examiner

U.S. Cl. X.R.

178—69.5; 307—232, 269; 328—56, 63, 72, 155